United States Patent Office 2,951,804
Patented Sept. 6, 1960

2,951,804

PURIFICATION OF REFORMATE CHARGE STOCKS USING ACTIVATED ALUMINA IMPREGNATED WITH ALKALI OR ALKALINE EARTH METAL HYDROXIDES

Andre L. Juliard, Narbeth, Pa., assignor to Houdry Process Corporation, Wilmington, Del., a corporation of Delaware No Drawing. Filed Oct. 22, 1957, Ser. No. 691,540

6 Claims. (Cl. 208—91)

This invention relates to the reforming of low octane naphthas, motor gasolines and the like to products of more enhanced value; and more particularly is concerned with the purification of such naphthas, motor gasolines and the like used as charge stocks for such reforming operations.

The practice of hydrogenative reforming of relatively light charge stocks such as light and heavy naphthas, motor gasolines and the like is well known in the art. The adjustment of operating conditions, depending on the nature of the charge stocks, is utilized to obtain certain desirable improvements with relatively moderate loss of the charge to less desirable by-products such as light fixed gases, hydrogen and carbon. As is well known, these reforming reactions may be effected by thermal type operation or by operations suitably modified through the use of certain well known catalytic agents. One type of catalytic agent quite widely used comprises a relatively small amount, e.g., 0.5 to 2 weight percent, of platinum suitably distributed on and supported by activated alumina.

The proper selection of operating conditions in conjunction with platinum-type catalyst may permit extended operating periods, such as in the order of 6 months or more, without depositing on the catalyst during the course of such operation any appreciable amounts of coke or hydrocarbonaceous deposit which might tend to inactivate such catalysts. However, the charge stocks subject to reforming operations may contain from trace amounts to sizeable quantities of extraneous components which operate during the course of the reaction to effect deactivation of the catalyzing ability of the catalyst agent. Platinum, for example, is particularly susceptible to poisoning by relatively small amounts of nitrogenous and sulfurous organic compounds and the heavy metals, including lead and arsenic. Even trace amounts of certain metallic poisons may build up to detrimental amounts on the catalyst during several months of continuing operation. The effect on the catalyst of such poisonous agents introduced with the charge may be the serious reduction of the effective catalytic life expectancy with resultant undesirable economic factors including too frequent replacement of the poisoned catalyst, and/or the degradation of the product distribution.

A variety of procedures for extending the life expectancy of platinum-type reforming catalyst is available in the art with less or greater effectiveness depending on the nature of the poisons, charge stocks and operating conditions. Such suggested methods include catalytic pretreatment, chemical pretreatment, fractionation and other methods. One particularly effective method utilizes the selective adsorption removal of heavy metal contaminants.

Applicant has now found a surprisingly effective adsorptive contact agent for the removal of acidic organic and/or heavy metal contaminants from reforming charge stocks. In accordance with this invention removal of contaminants present in reforming charge stocks is effected by adsorption on a contact agent comprising activated alumina having impregnated thereon an added base in an amount sufficient to establish a pH, as measured in aqueous suspension, of at least 6 and no greater than 8. Suitable bases are the hydroxides of the alkali metals and the alkaline earth metals; with the preferred bases being the hydroxide of either sodium or potassium.

The alumina suitable for use in accordance with this invention may be any suitable, adsorptive, usually porous alumina. A particularly effective type is the commercial activated alumina. In physical form the alumina is preferably in particulate form of suitable nature that the passage of hydrocarbons therethrough is not inordinately slow because of sizable pressure drop conditions. Aggregates such as pills, pellet granules or the like having gross linear dimensions in the range of 0.2 to 1.0 inch are generally highly satisfactory for the purposes of this invention.

The method of operation permits removal of substantially all of the acidic organic and/or heavy metal contaminants with such effectiveness that quantitative removal of materials such as arsenic, and acidic nitrogenous and sulfurous compounds may be obtained. As in other adsorptive processes, the adsorption treatment is most effective when operated no longer than for a time period in which the treated product is recovered with the contaminant content below some predetermined value. By a reasonable and practical selection of value, e.g., no more than 2 p.p.b. of arsenic, for acceptable product, it is possible to operate the adsorptive treatment in a practically continuous manner by the employment of two (or more) adsorptive chambers; one of which is operating in the treatment of charge stocks to remove poisonous contaminants, while the other is being regenerated and prepared for reuse. A proper time sequence determination of the operating period for the removal of contaminants may be satisfactorily based on analysis of the effluent, with cyclic operation of the multiple contact chambers on similar charge stocks based on interval operating periods within the time periods established by such analysis. Use of moving bed technique in the adsorptive treatment of charge stocks with the particulate basic alumina is also possible with certain advantages.

While various adsorptive methods have beenn previously suggested, none has approached the simplicity and effectiveness of the present system either in quantities of treating agents, extended operating periods or in practicality of general operation including the ready reactivation of the treating agent here proposed. It has been found, for example, that the basic alumina of the present invention is more than double in effective treating ability than commercially available activated alumina. This increased capacity alone permits the treament of at least double the amount of charge stocks than would be practical when employing just the activated alumina of commerce.

It has been found that when representative charge stocks are percolated through alumina, certain components of the oil are preferentially adsorbed in proportion to the relative adsorption coefficient and concentrations. Polycyclic compounds usually highly colored are strongly adsorbed. Arsenic compounds are similarly adsorbed so that in an adsorptive bed an arsenic free effluent may be obtained as long as the adsorptive compound is present in sufficient quantity to effect substantially complete adsorption.

The basic alumina herein proposed is far more effective for this type of treatment than the usual solid adsorptives such as activated alumina, kieselguhr, silica gel, fullers earth, acid-treated clays and the like. Thus, commercial activated alumina when treated with caustic solution, or similar base-imparting agent to impart the required degree of basicity, yields a stable, dry adsorbent having surprisingly adsorptive characteristics. For instance, it has been found that quantitative removal of arsenic by adsorbtive treatment with the basic alumina herein proposed is obtained. With some charge stocks, even an accepted analytical method for arsenic determination in hydrocarbon samples involving treatment with sulfuric acid, recovery of the acid extract followed by oxidation and measurement of the arsenic in the extract as arsine, gives incomplete removal of arsenic as shown in the table below.

| Arsenic p.p.b. in— | By regular Method | By Basic $Al_2O_3$ |
| --- | --- | --- |
| Selected Coker Naphtha #1 | 100 | 93-95 |
| Selected Coker Naphtha #2 | 20.5 | 24.5 |
| Blended Naphtha #1 | 6 | 26 |
| Blended Naphtha #2 | 8 | 25 |
| Naphtha #3, As Free | | 0 |
| +5 p.p.b. $As_2O_3$ | | 4 |
| +12 p.p.b. $As_2O_3$ | | 11 |

The above data show the efficient removal of arsenic by treatment with basic alumina. Operating as an analytical method, this procedure involved percolation of 400 ml. of the naphtha through a narrow column of 20 ml. of basic alumina prepared substantially as set forth in Example II below. After the percolation, the adsorbed material was eluted with caustic solution. The arsenic compounds in the eluate were converted to arsenites with arsenic determined by the classical arsine method.

Treatment of charge stocks may be effected by passage through fixed beds of the basic alumina or by suitable contact with particulate basic alumina material continuously moving through the contact zone at a rate sufficiently high to provide adequate selectivity for the contaminants. In such a moving bed system there is continuous removal of the contact agent, as for reactivating treatment in another region of the system by treatment to dissolve and remove organic contaminants and/or the heavy metal compounds with the reimpregnation of the alumina with caustic to the required degree of basicity. One method of reactivating the adsorbent includes serial desorption treatment with non-adsorbed solvents such as hexane, benzene, methanol, pyridine, and with aqueous caustic agents to remove hydrocarbons, nitrogen compounds, sulfur and polycyclic porphyrin-like compounds, and arsenic compounds, organic or inorganic. One or more suitable successive combinations of such treatment may be employed when selective recovery of individual compounds or materials is desirable or necessary. In addition, in the event that the alumina includes materials imparting dark color, and possibly odor, such may be removed by oxidative treatment. As is apparent, a range of contacting methods is available for decontaminating charge stocks for subsequent charging to reforming operations; likewise, the reactivation of the contact agent is readily effected with possibilities of the selective recovery of certain valuable adsorbates.

Example I

A catalyst comprising about 99% alumina and 0.5% by weight platinum, obtained by impregnation of the alumina with an aqueous solution of chloroplatinic acid followed by reduction treatment whereby metallic platinum is obtained, is used in the hydrogenative reforming of naphtha charge stock having a F–1 clear octane rating of 52.4. The charge stock has an arsenic content, determined by the basic alumina analytical adsorbtive method reported above, of about 96 p.p.b. (parts per billion). At the dehydrogenation conditions employed, the charge stock is upgraded in the initial operating period to an octane value of 94.8 F–1 clear. After a period of approximately 64 days of operation at the same conditions the liquid product has an octane rating of 70.7 F–1 clear.

Example II

In a comparative run, charge stock, as employed in Example I, is passed over platinum on alumina catalyst of the same type and at the same conditions of Example I. The added factor is that the charge stock, prior to admission to contact with the platinum catalyst, is first contacted with basic alumina. The basic alumina was prepared from commercial activated alumina treated with 10% sodium hydroxide solution by percolation of approximately one hundred parts of solution through seventy-five parts of alumina (by weight). The alumina has a size range of about 8 to 200 mesh. The treated material was water washed by successive water washings reducing the causticity of the treated alumina to a pH slightly less than 8, and containing about 0.65 percent by weight of sodium hydroxide. This material was heated at 200° C. for 12 hours and the dried adsorbent was utilized as the contact material for pretreating the naphtha charge. About ten parts by weight of the naphtha charge were treated with one part by weight of the basic alumina thus prepared.

The effluent from the reforming from the initial period of operation has an F–1 clear octane rating of 93.7. After an operating period at conditions similar to Example I of approximately 64 days, the reformer product has an F–1 clear octane rating of 79.2. Thus, the initial octane of the reforming step on the pretreated stock is somewhat lower, the octane rating over the entire operating period is substantially higher (79.2 vs. 70.7 after extended operation) than obtained with the non-pretreated stock.

From the foregoing it is seen that the described contact agent and the pretreating system can be advantageously utilized for the upgrading of charge stocks containing adsorbable contaminants. It is also evident that the pretreatment of such charge stocks is effective in increasing the time of effective active life of platinum-type reforming catalysts.

It is customary in some reforming systems wherein platinum-type catalysts are employed to insure the presence of adequate acid catalyzing component in the reforming stage by adding with the charge stock small quantities of an acid providing agent. When such systems are employed in conjunction with a pretreatment system as herein set forth, it is desirable to introduce such acid agent subsequent to the pretreatment stage. Thus, the acid agent is not subject to contact with the slightly basic treating agent and possible removal of the added acid agent is avoided.

Obviously many modifications and variations of the present invention as hereinbefore set forth may be made without departing from the spirit and scope thereof and therefore only such limitations should be imposed as are indicated in the appended claims.

What is claimed is:

1. The method of upgrading hydrocarbon charge stocks to be reformed in contact with platinum on alumina catalyst and containing deactivating amounts of catalyst contaminants comprising treating such a charge stock at adsorptive conditions with an adsorptive agent comprising basic alumina having a pH value in the range of 6 to 8, said adsorptive agent having been prepared by impregnating activated alumina with an aqueous solution of alkali metal hydroxide to deposit thereon alkali metal hydroxide in excess of 1.0% by weight of said alumina, subsequently water washing said impregnated material to remove alkali metal hydroxide in excess of 0.8 weight percent of the treated alumina and establishing a pH of the alumina plus alkali metal hydroxide in the range of 6 to 8, and thereafter drying to remove substantially all free water.

2. The method of reforming hydrocarbon charge stocks containing catalyst deactivating quantities of arsenic contaminants, such reforming being effected in the presence of platinum-containing catalysts, comprising contacting such a charge stock with dry basic alumina contact agent characterized in consisting of at least 99% by weight of commercial activated alumina and about 0.6 weight percent of sodium hydroxide, said alumina having been impregnated with aqueous sodium hydroxide solution to incorporate sodium hydroxide in excess of 1.0% by weight of the alumina with subsequent water washing to said 0.6 weight percent of sodium hydroxide followed by drying, effecting such contact at adsorptive conditions including contacting at least 10 parts by weight of said charge stock with each part by weight of contact agent, recovering effluent from said contacting as a substantially contaminant-free stock, and charging said contaminant-free stock to catalytic reforming at reforming conditions in the presence of platinum-containing catayst.

3. The method according to claim 1 wherein said treating is effected in the presence of a static bed of said basic alumina.

4. The method according to claim 3 further characterized in that said static bed is periodically reactivated by process including discontinuing contact with said charge stock, selectively removing from said basic alumina materials adsorbed thereon, reestablishing by addition of 0.3 to 0.8 weight percent alkali metal hydroxide the basicity of said alumina in a range of 6 to 8 pH and contacting further quantities of charge with the thus reactivated contact agent.

5. The method according to claim 1 wherein the removal of contaminants from the charge stock is effected by contact with said basic alumina in a moving bed operation.

6. The method according to claim 5 wherein said basic alumina is continuously circulated through a stage for the removal of contaminants from the charge stock and at least one additional stage for the reactivation of said basic alumina.

References Cited in the file of this patent

UNITED STATES PATENTS

| | | |
|---|---|---|
| 1,904,381 | Morrell | Apr. 18, 1933 |
| 2,361,008 | Buddrus et al. | Oct. 24, 1944 |
| 2,481,300 | Engel | Sept. 6, 1949 |
| 2,779,718 | Capell et al. | Jan. 29, 1957 |